United States Patent
Deshmukh

(10) Patent No.: US 10,302,839 B1
(45) Date of Patent: May 28, 2019

(54) LIGHT GUIDE STRUCTURE HAVING LIGHT TRAP SECTION

(71) Applicants: DENSO International America, Inc., Southfield, MI (US); DENSO CORPORATION, Kariya, Aichi-pref (JP)

(72) Inventor: Amol Deshmukh, Canton, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 14 days.

(21) Appl. No.: 15/843,802

(22) Filed: Dec. 15, 2017

(51) Int. Cl.
  *F21V 8/00* (2006.01)
  *B60Q 3/14* (2017.01)
  *B60K 37/02* (2006.01)

(52) U.S. Cl.
  CPC ............ *G02B 6/0028* (2013.01); *B60Q 3/14* (2017.02); *G02B 6/0068* (2013.01); *G02B 6/0075* (2013.01); *B60K 37/02* (2013.01); *B60K 2350/203* (2013.01)

(58) Field of Classification Search
  CPC ............... G02B 6/0068; G02B 6/0021; G02F 1/133603
  USPC ........................................................ 362/612
  See application file for complete search history.

(56) References Cited

U.S. PATENT DOCUMENTS

| | | | |
|---|---|---|---|
| 7,771,069 B2 | 8/2010 | Werman et al. | |
| 2010/0135042 A1* | 6/2010 | Tsai | G02B 6/0038 362/628 |
| 2011/0038137 A1* | 2/2011 | Ishikawa | G01D 11/28 362/23.14 |
| 2014/0376258 A1* | 12/2014 | Wu | G02B 6/0055 362/607 |
| 2015/0346413 A1* | 12/2015 | Kadoriku | G02B 6/0016 362/613 |
| 2016/0109639 A1* | 4/2016 | Kurata | G02F 1/133615 349/65 |
| 2017/0227182 A1* | 8/2017 | Hirata | F21S 41/24 |

* cited by examiner

*Primary Examiner* — Ahshik Kim

(57) ABSTRACT

A light guide structure includes a first light guide and a second light guide configured to guide light therein, and a bridge integrally formed with the first light guide and the second light guide. The bridge includes a first end connected to the first light guide, a second end connected to the second light guide, and a light trap section formed between the first end and the second end. The light trap section includes an inwardly V-shaped wall section and a outwardly V-shaped wall section on opposing sides from each other, the inwardly V-shaped wall section configured with a greater V-angle than the outwardly V-shaped wall section.

17 Claims, 5 Drawing Sheets

A1=120°
A2=120°

A1=120°
A2=90°

A1=120°
A2=90°

LIGHT GUIDE STRUCTURE HAVING LIGHT TRAP SECTION

TECHNICAL FIELD

The present disclosure relates to a light guide structure which includes a light trap section.

BACKGROUND

An instrument cluster provided within automobiles generally include illuminated indicating devices for displaying vehicle information such as vehicle speed, fuel level, or headlamp status. Typically such illuminated indicating devices include a display surface, a light source, and a light guide disposed between the display surface and the light source. The display surface is generally provided with indicia corresponding to vehicle information, and such indicia are illuminated with light output from the light source and carried by the light guide.

SUMMARY

According to an aspect of the present disclosure, at least two light guides, each of which is configured to guide light therein, are integrally connected to each other through a bridge to form a light guide structure. The bridge includes a light trap section configured to block a substantial amount of light from passing therethrough.

DETAILED DESCRIPTION

First Embodiment

Figure 1:
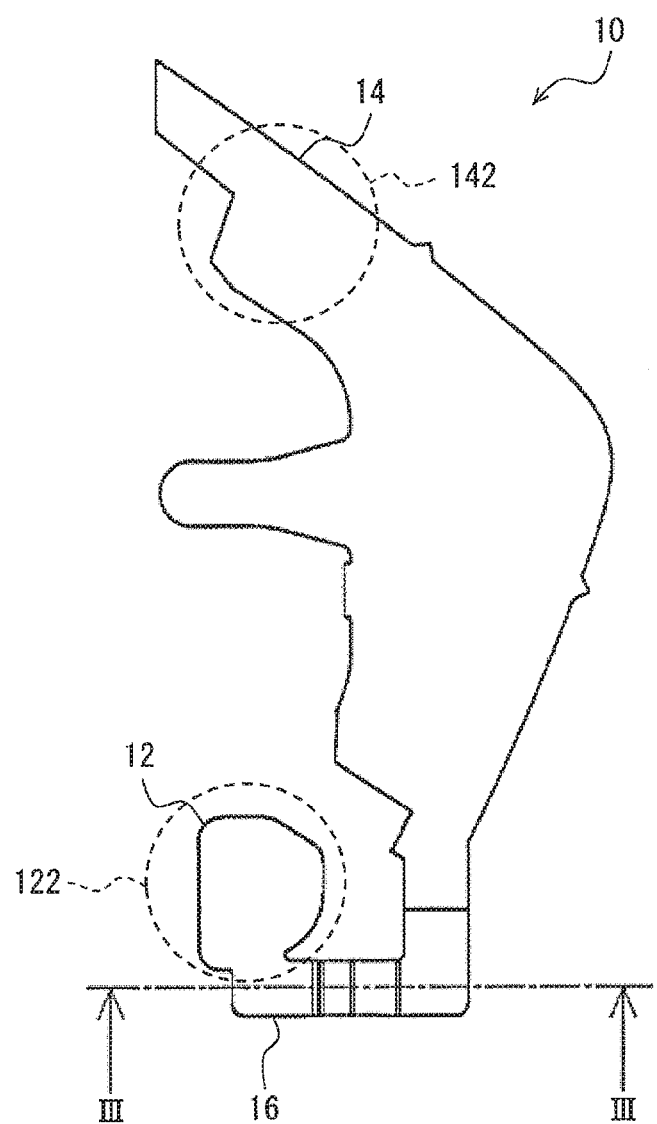
FIG. 1 is a plan view of a light guide structure.

FIG. 1 is a plan view of a light guide structure 10 according to a first embodiment of the present disclosure. It should be noted that the specific shape of the light guide structure 10 shown in FIG. 1 is exemplary in nature and is not intended to be limiting. As will become clear in the following explanations, the shape and size of the light guide structure 10 may be modified as appropriate based on specific applications. The light guide structure 10 is an optical prism configured to guide light. In the present embodiment, the light guide structure 10 is an acrylic prism. In alternative embodiments, the light guide structure 10 may be formed of other types of transparent materials, including resin or other plastics.

As illustrated in FIG. 1, the light guide structure 10 includes a first light guide 12, a second light guide 14, and a bridge 16 which connects the first light guide 12 with the second light guide 14. The first light guide 12, the second light guide 14, and the bridge 16 are integrally formed with each other, for example by injection molding or casting.

Figure 2:
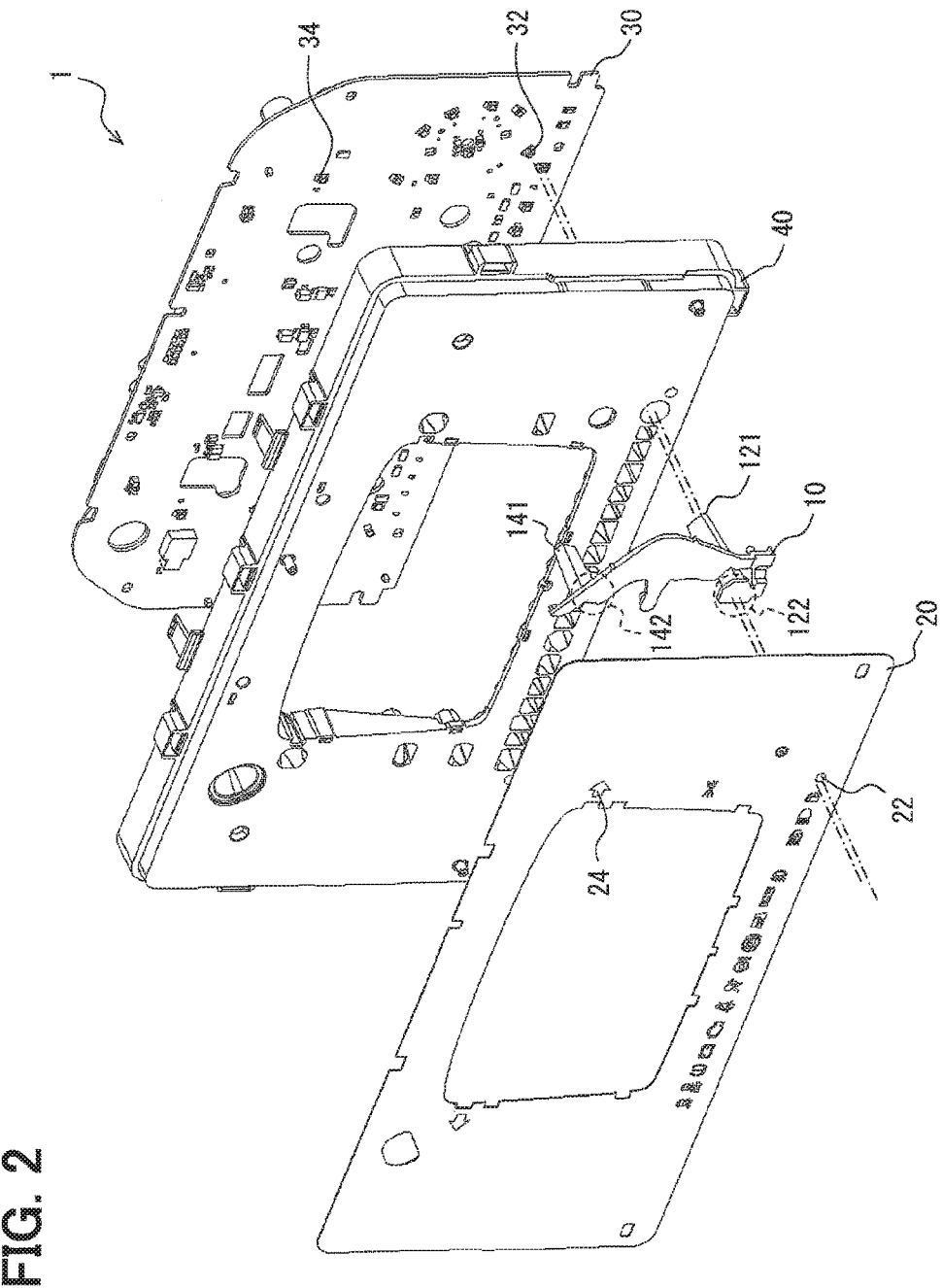
FIG. 2 is an exploded view of an illuminated indicating device.

The light guide structure 10 is configured to be mounted in an illuminated indicating device 1, as illustrated in FIG. 2. The illuminated indicating device 1 may be, for example, part of a vehicular instrument cluster. The light guide structure 10 is disposed between a display surface 20 and a light source 30. In the illustrated embodiment, the display surface 20 is a front panel of the illuminated indicating device 1, and includes display indicia 22, 24. The display indicia 22, 24 are formed at locations corresponding to the locations of the first light guide 12 and the second light guide 14. Further, in the illustrated embodiment, the light source 30 is a circuit substrate, on which a variety of electrical components are mounted, including light emitting diodes (LEDs) 32, 34. The LEDs 32, 34 are also disposed at locations corresponding to the locations of the first light guide 12 and the second light guide 14.

A support structure 40 may be disposed in between the light guide structure 10 and the light source 30. In the illustrated embodiment, the support structure 40 is provided with mounting holes for positioning the light guide structure 10 with respect to the display surface 20 and the light source 30. However, in alternative embodiments, the support structure 40 does not need to be separately provided, and may be integrally formed with, for example, the display surface 20 or the light source 30.

The light guide structure 10 is configured to guide light from the LEDs 32, 34 of the light source 30 to the display indicia 22, 24 of the display surface 20. As a result, the display indicia 22, 24 may be illuminated by light emitted from the LEDs 32, 34. Then, by selectively powering on and off the LEDs 32, 34, the display indicia 22, 24 may be selectively illuminated to convey vehicle operational information to a passenger.

Figure 3:
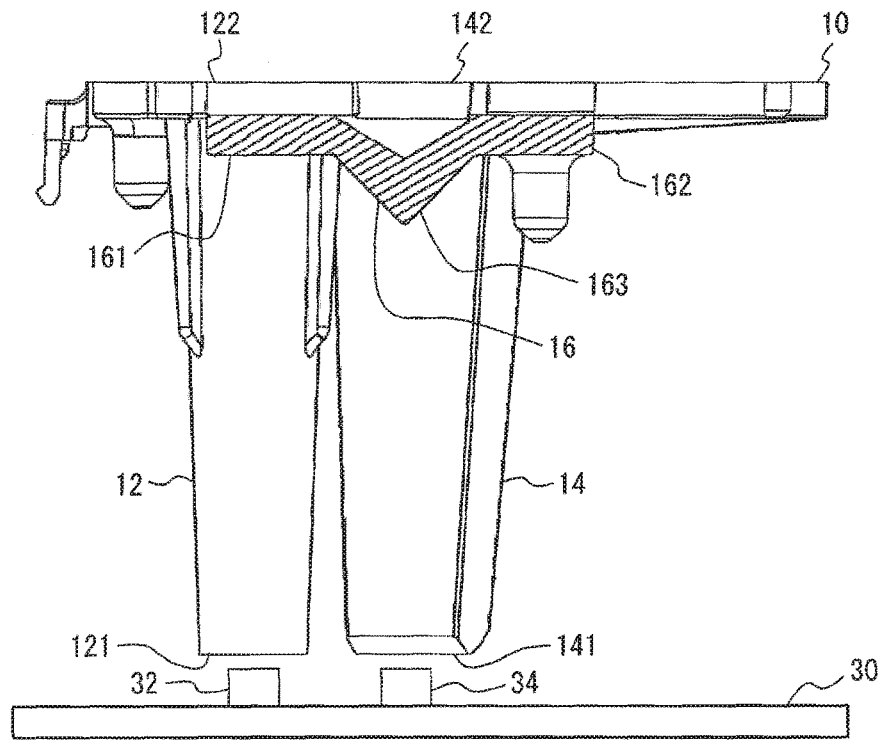
FIG. 3 is a cross section view of a light guide structure.

As shown in FIG. 3, the first light guide 12 includes a first input face 121 which faces the LED 32, and includes a first output face 122 on the opposite end from the first input face 121. The first output face 122 is positioned to face the display indicia 22 (see FIG. 2). In this regard, the light guide structure 10 is provided such that light emitted from the LED 32 enters the first input face 121 and exits out of the first output face 122 to illuminate the display indicia 22.

In the present embodiment, the output side of the light guide structure 10 (i.e., the surface shown in FIG. 1) is formed as a flat plate member. As a result, in practice, the entire output surface shown in FIG. 1 may be illuminated to some extent when the light guide structure 10 is outputting light, due to the integral formation of the light guide structure 10. Accordingly, there is no clear physical delineation with respect to the boundaries of the first output face 122. Instead, as shown by a dotted circle in FIGS. 1 and 2, the first output face 122 generally refers to a portion of the surface of the light guide structure 10 that corresponds to the position of the first input face 121 and therefore outputs the majority of the light guided from the first input face 121.

The second light guide 14 is positioned in a similar manner with respect to the LED 34. Specifically, the second light guide 14 similarly includes a second input face 141 which faces the LED 34, and includes a second output face 142 on the opposite end from the second input face 141. The second output face 142 is positioned to face the display indicia 24 (see FIG. 2). In this regard, the light guide structure 10 is provided such that light emitted from the LED 34 enters the second input face 141 and exits out of the second output face 142 to illuminate the display indicia 24.

In addition, similar to the first output face 122, the second output face 142 also generally refers to a portion of the surface of the light guide structure 10 that corresponds to the position of the second input face 141 and therefore outputs the majority of the light guided from the second input face 141.

The illustrated shape of the light guide structure 10 is not intended to be limiting with respect to the first input face 121, the first output face 122, the second input face 141, or the second output face 142. For example, in an alternate embodiment, the first output face 122 and/or the second output face 142 may be formed as a protrusion and thus have a clearly delineated shape.

The shapes and sizes of the first light guide 12 and the second light guide 14 are not necessarily the same, and may be modified as appropriate based on the desired application. In addition, the exemplary shapes of the first light guide 12 and the second light guide 14 in the figures are not intended to be limiting. For instance, while FIG. 3 illustrates a tapered shape, the first light guide 12 or the second light guide 14 may be formed in a variety of geometric and non-geometric shapes, such as rectangular prisms, oblique prisms, or irregular polyhedrons as long as light is guided from the light source 30 to the display surface 20.

In order to guide light, light may be entirely or mostly prevented from exiting the side walls of the first light guide 12 and the second light guide 14 by relying on the phenomenon of total internal reflection, which causes light to be entirely reflected by the side walls of the first light guide 12 and the second light guide 14 over a particular range of angles. Additional processing may be performed on the side walls of the first light guide 12 and the second light guide 14 to further prevent light from exiting from the side walls, such as coating the outside of the side walls with a reflective material, e.g., through aluminum sputtering. As a result, light may be reliably guided from the first input face 121 to the first output face 122 in the first light guide 12, and from the second input face 141 to the second output face 142 in the second light guide 14.

The bridge 16, which connects the first light guide 12 with the second light guide 14, is integrally formed with the first light guide 12 and the second light guide 14 from the same material, e.g., acrylic. In other words, there is no physical medium boundary between the bridge 16, the first light guide 12, and the second light guide 14. As such, the phenomenon of total internal reflection would not occur at the connection portions between the bridge 16, the first light guide 12, and the second light guide 14. In addition, due to the integral forming, it is not physically possible to apply a reflective material between the bridge 16 and the first light guide 12 or the second light guide 14. As a result, light within the light guide structure 10 may freely cross the boundaries between the first light guide 12, the second light guide 14, and the bridge 16.

In addition, since the bridge 16 is integrally formed with the first light guide 12 and the second light guide 14 from the same material as a monolithic entity, there is no physical delineation between these elements, and so it is not possible to identify a non-arbitrary boundary between these elements. In this regard, labels such as "light guide" as used herein are not intended to refer to exact portions of the light guide structure 10, but rather general areas as defined by their functions and well understood by a skilled artisan.

Next, the structural configuration of the bridge 16 will be described. As outlined in FIG. 3, the bridge 16 includes a first end 161 connected to the first light guide 12, a second end 162 connected to the second light guide 14, and a light trap section 163 formed between the first end 161 and the second end 162. Similar to the overall light guide structure 10, since the bridge 16 itself is also an integrally formed prism, there is no physical delineation between the first end 161, the second end 162, and the light trap section 163. Accordingly, in this case as well, labels such as "first end" as used herein are not intended to refer to exact portions of the bridge 16, but rather general areas as defined by their functions.

The bridge 16 is connected to the first light guide 12 and the second light guide 14 in a manner so as to not interfere with the light guiding faces of the first light guide 12 and the second light guide 14. For example, the first end 161 of the bridge 16 may be connected to the first light guide 12 between the first input face 121 and the first output face 122. Further, the second end 162 of the bridge 16 may be connected to the second light guide 14 between the second input face 141 and the second output face 142.

Figure 4:
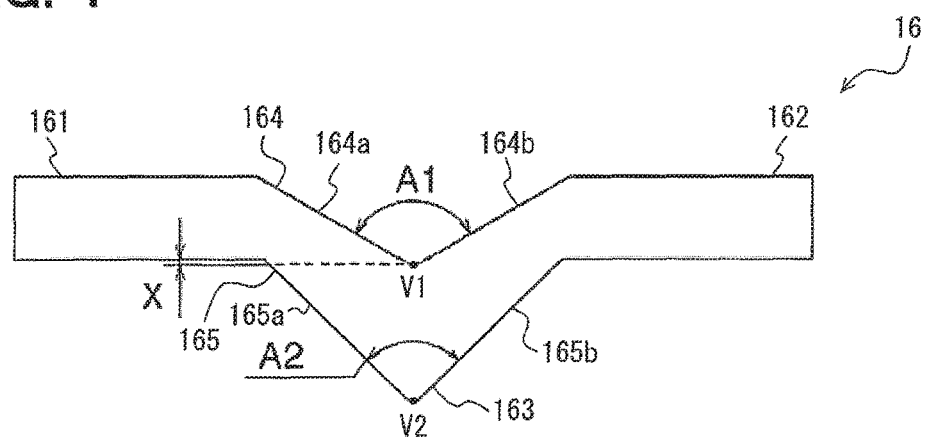
FIG. 4 is a schematic view of a bridge.

FIG. 4 shows a detailed schematic view of the bridge 16 and its light trap section 163. As illustrated, the light trap section 163 is formed by an inwardly V-shaped wall section 164 and an outwardly V-shaped wall section 165 on opposing sides from each other. In other words, the inwardly V-shaped wall section 164 and the outwardly V-shaped wall section 165 face each other. The inwardly V-shaped wall section 164 is configured with a V-angle A1 which is greater than a V-angle A2 of the outwardly V-shaped wall section 165. The remaining wall sections of the light trap section 163, i.e., those connecting the inwardly V-shaped wall section 164 with the outwardly V-shaped wall section 165, are preferably simple flat walls as illustrated in FIG. 1.

The inwardly V-shaped wall section 164 includes a pair of inwardly angled surfaces 164a, 164b which are angled toward the inside of the light trap section 163 (i.e., formed as a depression) and which connect to each other at an inner vertex V1. In other words, the pair of inwardly angled surfaces 164a, 164b are angled toward the inner vertex V1. The V-angle A1 is defined as a minimum positive angle between the pair of inwardly angled surfaces 164a, 164b. Similarly, the outwardly V-shaped wall section 165 includes a pair of outwardly angled surfaces 165a, 165b which are angled away from the inside of the light trap section 163 (i.e., formed as a protrusion) and which connect to each other at an outer vertex V2. In other words, the pair of outwardly angled surfaces 165a, 165b are angled toward the outer vertex V2. The V-angle A2 is defined as a minimum positive angle between the pair of outwardly angled surfaces 165a, 165b.

As illustrated in FIG. 4, the inner vertex V1 is positioned closer to the outer vertex V2 than the first end 161 and the second end 162 are to the outer vertex V2 by a margin X in a direction from the inner vertex V1 to the outer vertex V2. In other words, the pair of inwardly angled surfaces 164a, 164b block a direct path for light from the first end 161 to the second end 162, since the pair of inwardly angled surfaces 164a, 164b connect to each other at the inner vertex V1. While FIG. 4 illustrates sharp angles near the vertices V1, V2, in practice, due to manufacturing constraints etc., the light trap section 163 may be slightly curved at the vertices V1, V2.

In the present embodiment, the V-angle A1 of the inwardly V-shaped wall section 164 is preferably between 110 degrees and 130 degrees, and more preferably between 115 and 125 degrees. In one preferred embodiment, the V-angle A1 is 120 degrees. Further in the present embodiment, the V-angle A2 of the outwardly V-shaped wall section 165 is preferably between 80 and 100 degrees, and more preferably between 85 and 95 degrees. In one preferred embodiment, the V-angle A2 is 90 degrees. Further, as a skilled artisan would readily appreciate, these angle values are not intended to be exact, and are intended to include slight variations which may be caused by a number of factors such as tolerance during manufacturing, minor deformations during transport, storage, or use, etc.

Next an operational effect of the bridge 16 according the present embodiment will be explained with reference to FIGS. 5A to 5C, which are optic ray simulations assuming perfectly reflective surfaces arranged in a manner analogous to the bridge 16 of the present embodiment.

As described previously, since the bridge 16 is integrally formed with the first light guide 12 and the second light guide 14, light is free to travel through any arbitrary boundary between these elements. In this case, there is a concern that light from the first light guide 12 may inadvertently travel through the bridge 16 and leak into the second light guide 14, or conversely leak from the second light guide 14 into the first light guide 12. Such a light leak may result in an unintended illumination of the indicia 22, 24 in the illuminated indicating device 1. However, with the configuration of the light guide structure 10 described in the present embodiment, the light trap section 163 of the bridge 16 may prevent most or substantially all light from leaking between the first light guide 12 and the second light guide 14.

Figure 5A:
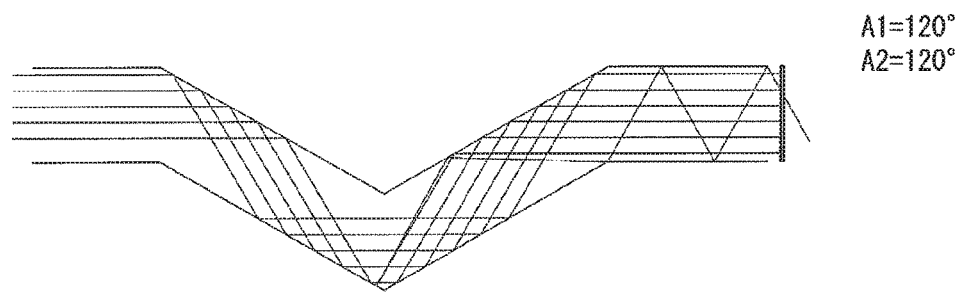
FIG. 5A is an optic ray simulation view of a comparative example.

First, a comparative example is shown in FIG. 5A. In the comparative example, there is no direct path for light to travel through the bridge, similar to the present embodiment. However, contrary to the bridge 16 of the present embodiment, the comparative example in FIG. 5A is formed with equal V-angles A1, A2 each set at 120 degrees. In this case, assuming a beam light source on the right hand side, nearly all of the emitted light rays still pass through the comparative example due to reflection. In other words, if light from either one of the first light guide 12 and the second light guide 14 enters the comparative example structure, a large portion of that light may then leak through to the other one of the first light guide 12 and the second light guide 14. This leaked light may then result in unintended illuminations.

Figure 5B:
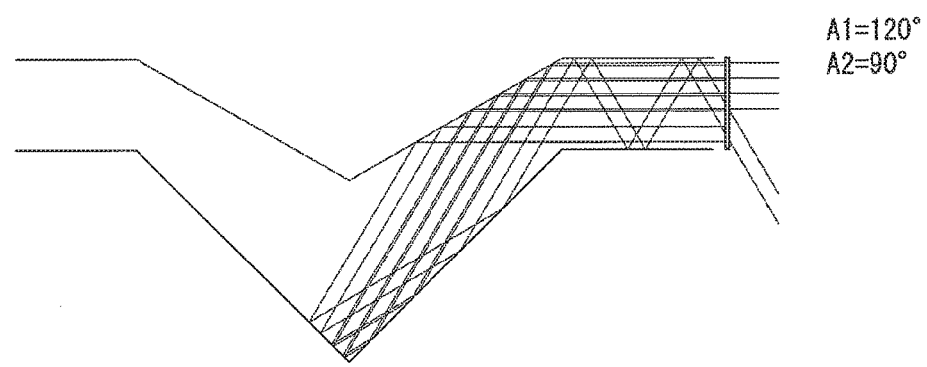
FIG. 5B is an optic ray simulation of a bridge.

In contrast, FIG. 5B shows a bridge structure that satisfies the relationship A1>A2 with the preferred values of A1 being 120 degrees and A2 being 90 degrees. In this case, assuming a beam light source on the right hand side, most or substantially all light rays are reflected back toward the right hand side. In other words, according to the present embodiment, even if light from either one of the first light guide 12 and the second light guide 14 enters the bridge 16, very little to no light leaks through to the other one of the first light guide 12 and the second light guide 14.

Figure 5C:
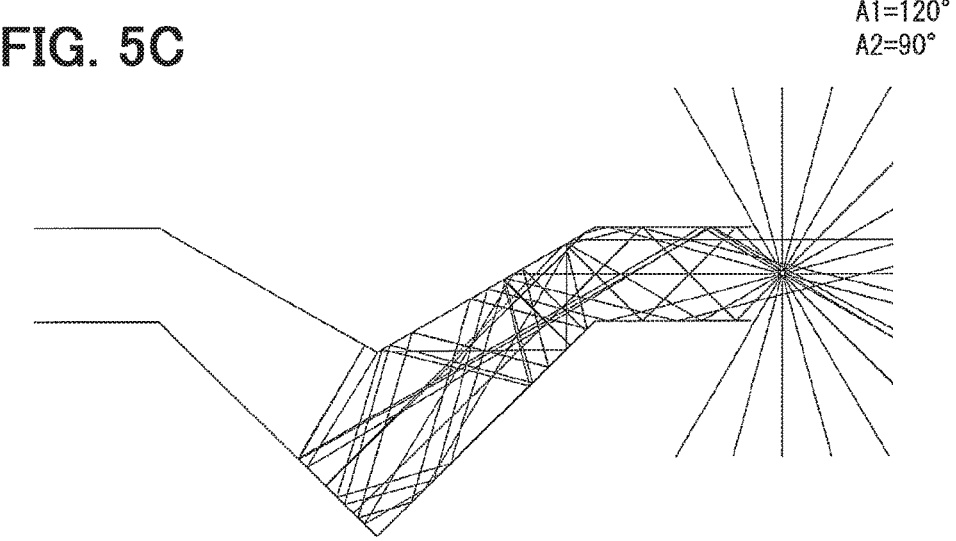
FIG. 5C is an optic ray simulation of a bridge.

FIG. 5C is provided for completeness and illustrates the same situation as FIG. 5B except with a point light source on the right hand side instead of a beam light source. Even in this case, as shown, substantially all light rays are reflected back toward the right hand side.

It should be noted that the diagrams of FIGS. 5A to 5C are simplifications and in practice, it is unlikely that all light rays in all situations are completely blocked by the light trap section 163. This is because of a variety of factors, including light rays which may enter the bridge 16 at extreme angles to bypass the light trap section 163, manufacturing imperfections causing unpredictable or incomplete reflections at some parts, and other uncontrollable factors. As such, it is not the intention of the present disclosure to provide a bridge 16 capable of blocking all light from passing therethrough. Rather, it is sufficient as long as the bridge 16 is capable of blocking a sufficient portion of leaked light such that any unintended illumination caused by the leaked light is not easily noticed by a user.

To further reduce light leak, the bridge 16 itself may be treated to prevent light from escaping through its side walls (e.g., the inwardly V-shaped wall section 164 or the outwardly V-shaped wall section 165). For example, the outside of the bridge 16 may also be treated with a reflective material, e.g., through aluminum sputtering. This ensures that light within the bridge 16 is properly reflected.

The light guide structure 10 according to the present embodiment exhibits a number of technical advantages.

According to the present embodiment, the bridge 16 is integrally formed with the first light guide 12 and the second light guide 14. In other words, the first light guide 12 and the second light guide 14 are provided together as a single component as the light guide structure 10. In this case, the light guide structure 10 may be manufactured in a simple and quick manner, i.e., through injection molding, rather than manufacturing each light guide 12, 14 separately. This advantage is especially pronounced when applied to a vehicle instrument panel such as the illuminated indicating device 1. As shown in FIG. 2 for example, a large number of display indicia may be provided on a vehicle instrument panel, and therefore a large number of very closely arranged prisms may be required. By utilizing the configuration disclosed herein, this large number of difficult to install parts may be merged into an integral prism.

Further, when the light guide structure 10 of the present embodiment is applied to the illuminated indicating device 1 shown in FIG. 2, the number of components that need to be installed may be reduced when compared to a situation where the first light guide 12 and the second light guide 14 are separately provided. In addition, the light guide structure 10 may be reliably installed in the correct position and orientation due to its rigid structure when compared to a situation where the first light guide 12 and the second light guide 14 are separately provided. In this regard, the assembly process for the illuminated indicating device 1 may be improved to be more efficient and less error prone.

Further according to the present embodiment, the inwardly V-shaped wall section 164 is configured with the V-angle A1 which is greater than the V-angle A2 of the outwardly V-shaped wall section 165. Due to this, the light trap section 163 of the bridge 16 is inherently configured to block (or reflect back) most or substantially all light from passing therethrough. Therefore, even if the first light guide 12 and the second light guide 14 are integrally formed, the amount of light that leaks between the first light guide 12 and the second light guide 14 may be reduced. As a result, unintended illumination of the indicia 22, 24 may be reduced to unnoticeable levels.

Further according to the present embodiment, the light blocking function of the bridge 16 is an inherent optical property of the bridge 16 as a result of satisfying the A1>A2 relationship as defined herein, and so there is no need to further process the light guide structure 10 to block light.

Further according to the present embodiment, the V-angle A1 of the inwardly V-shaped wall section 164 is preferably between 110 degrees and 130 degrees, and more preferably between 115 and 125 degrees. In addition, the V-angle A2 of the outwardly V-shaped wall section 165 is preferably between 80 and 100 degrees, and more preferably between 85 and 95 degrees. Due to this configuration, the light trap section 163 of the bridge 16 may block a significant portion of light from passing therethrough.

Further according to the present embodiment, the V-angle A1 of the inwardly V-shaped wall section 164 is preferably 120 degrees. In addition, the V-angle A2 of the outwardly V-shaped wall section 165 is preferably 90 degrees. Due to this configuration, the light trap section 163 of the bridge 16 may block an even greater portion of light from passing therethrough.

Second Embodiment

In the first embodiment, the bridge 16 is formed in a substantially symmetrical manner about the vertices V1, V2. However, the present disclosure is not intended to be limited to a symmetrical bridge 16, and a variety of shapes are contemplated. For example, a second embodiment of the present disclosure illustrated in FIGS. 6 and 7 show an asymmetrical bridge 56.

Figure 6:
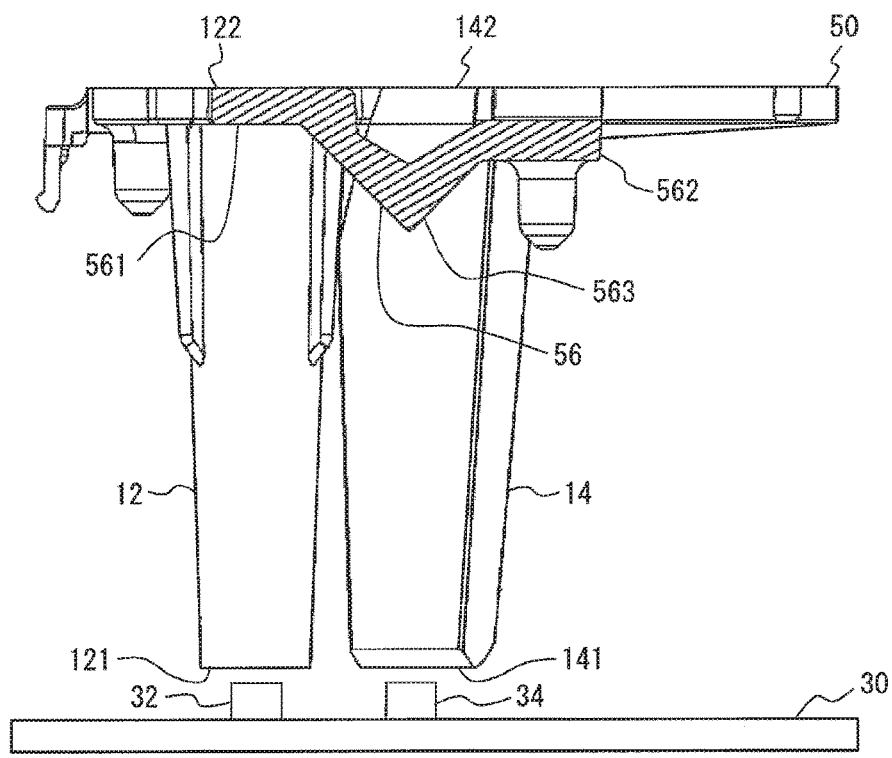
FIG. 6 is a cross section view of a light guide structure.
Figure 7:
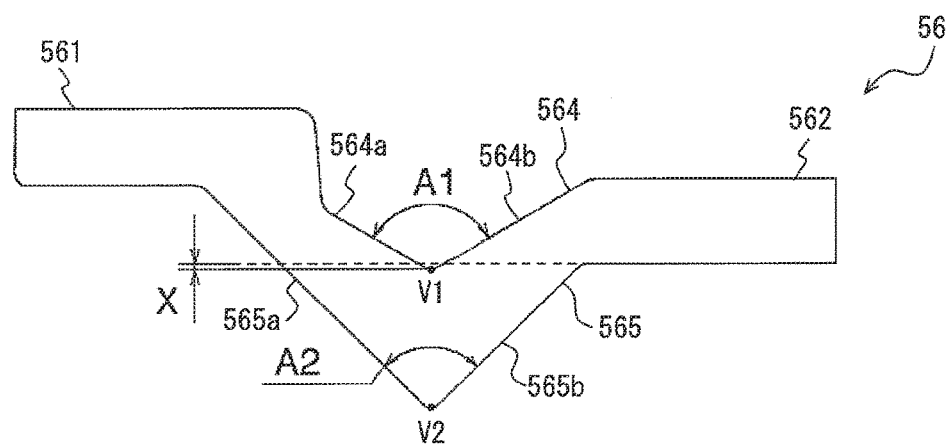
FIG. 7 is a schematic view of a bridge.

As shown in FIG. 6, a light guide structure 50 according to the second embodiment includes a first light guide 12 and a second light guide 14 in a similar manner as the first embodiment. Accordingly, detailed descriptions related to the first light guide 12 and the second light guide 14 are omitted for brevity. In addition, elements other than the light guide structure 50, such as the light source 30, may be configured in the same manner as in the first embodiment, and so descriptions thereof are omitted as well for brevity.

Further similar to the first embodiment, the bridge 56 includes a first end 561, a second end 562, and a light trap section 563. The light trap section 563 of the bridge 56 is formed by an inwardly V-shaped wall section 564 and an outwardly V-shaped wall section 565 on opposing sides from each other. The inwardly V-shaped wall section 564 is configured with a V-angle A1 which is greater than a V-angle A2 of the outwardly V-shaped wall section 565.

However, the bridge 56 of the present embodiment differs from that of the first embodiment by having an asymmetric shape about the vertices V1, V2. Specifically, in the present embodiment, the inwardly V-shaped wall section 564 includes a pair of inwardly angled surfaces 564a, 564b which are different from each other in length. In addition, the outwardly V-shaped wall section 565 includes a pair of outwardly angled surfaces 565a, 565b which are different from each other in length. In this regard, the first end 561 is offset from the second end 562 in the height direction (the height direction being an arbitrary direction corresponding to the up-down direction in FIGS. 6 and 7).

According to the present embodiment as well, the light trap section 563 still sufficiently blocks light while being formed in an asymmetric manner. This exemplary embodiment is intended to illustrate that the light guide structure of the present disclosure is intended to cover a variety of shapes and forms, as long as there is provided a pair of V-shaped surfaces formed to satisfy the A1>A2 relationship as defined herein. Thus, the light guide structure of the present disclosure may be adapted to a wide variety of applications.

Other Embodiments

The present disclosure is described with reference to the above embodiments, but these embodiments are not intended to be limiting. A variety of modifications which do not depart from the gist of the present disclosure are contemplated.

In the above described embodiments, the light guide structure includes two light guides connected by a bridge. However, the present disclosure is not limited to these specific numbers of light guides and bridges. In alternative embodiments, the light guide structure may include three or more light guides, and a corresponding number of bridges may be provided to connect the plurality of light guides to each other.

In the above described embodiments, the light trap section of the bridge is bent in a downward direction (the downward direction being an arbitrary direction corresponding to the up-down direction in FIGS. 3 to 7). However, the present disclosure is not intended to be limited to a light trap section which is bent in a specific direction. Rather, the light trap section may be bent in any direction, as long as the pair of V-shaped surfaces are formed to satisfy the A1>A2 relationship. Accordingly, the light trap section may be formed in a variety of manners which allow flexible manufacturing of the overall light guide structure to specific applications.

In the above described embodiments, the pair of inwardly angled surfaces are illustrated as being at substantially the same angle as each other with respect to an overall axial direction of the bridge. In alternative embodiments, the pair of inwardly angled surfaces may be formed at different angles as each other while still maintaining the A1>A2 relationship. The same applies to the pair of outwardly angled surfaces.

In the above described embodiments, the inner vertex is described as being positioned closer to the outer vertex than the first end and the second end by a margin X in a direction from the inner vertex to the outer vertex. In general, it is desirable for this margin X to be small, in order to minimize the overall size of the bridge and improve the rigidity of the overall light guide structure. Accordingly, in alternative embodiments, this margin X may be zero instead. Further alternatively, the margin X may be a negative value, i.e., the inner vertex may be positioned further from the outer vertex than the first end and the second end, thereby opening a partial direct path for light to travel from the first end to the second end. Even in this case, by providing the light trap section, a substantial portion of light may be prevented from travelling through the bridge.

As used throughout the specification and claims, "substantially" and "about" include at least deviations from ideal or nominal values that are within manufacturing, operational and/or inspection tolerances.

The use of terms such as "first", "second", "third", or "fourth" is solely for the purpose of identification, and is not intended to limit the order or relationships of applicable elements.

The invention claimed is:

1. A light guide structure, comprising:
   a first light guide configured to guide light therein;
   a second light guide configured to guide light therein; and
   a bridge integrally formed with the first light guide and the second light guide, the bridge including
      a first end connected to the first light guide,
      a second end connected to the second light guide, and
      a light trap section formed between the first end and the second end,
   wherein
      the light trap section includes an inwardly V-shaped wall section and a outwardly V-shaped wall section on opposing sides from each other, the inwardly V-shaped wall section configured with a greater V-angle than the outwardly V-shaped wall section,
   wherein
      the inwardly V-shaped wall section includes an inner vertex and a pair of inwardly angled surfaces which are angled toward the inner vertex and which connect to each other at the inner vertex, and
      the outwardly V-shaped wall section includes an outer vertex and a pair of outwardly angled surfaces which are angled toward the outer vertex and which connect to each other at the outer vertex.

2. The light guide structure of claim 1, wherein
the pair of inwardly angle surfaces have different lengths as each other, and
the pair of outwardly angled surfaces have different lengths as each other.

3. The light guide structure of claim 2, wherein
the first end of the bridge is offset from the second end of the bridge along a direction from the inner vertex to the outer vertex.

4. The light guide structure of claim 1, wherein
the inner vertex is positioned closer to the outer vertex than the first end and the second end are to the outer vertex in a direction from the inner vertex to the outer vertex to block a direct path for light from the first end to the second end.

5. The light guide structure of claim 1, wherein
the V-angle of the inwardly V-shaped wall section is defined as a minimum positive angle between the pair of inwardly angled surfaces, and
the V-angle of the outwardly V-shaped wall section is defined as a minimum positive angle between the pair of outwardly angled surfaces.

6. The light guide structure of claim 5, wherein
the V-angle of the inwardly V-shaped wall section is between 110 degrees and 130 degrees, and
the V-angle of the outwardly V-shaped wall section is between 80 degrees and 100 degrees.

7. The light guide structure of claim 6, wherein
the V-angle of the inwardly V-shaped wall section is 120 degrees, and
the V-angle of the outwardly V-shaped wall section is 90 degrees.

8. The light guide structure of claim 1, wherein
the first light guide includes a first input face and a first output face, the first light guide being configured to guide light from the first input face to the first output face, and
the second light guide includes a second input face and a second output face, the second light guide being configured to guide light from the second input face to the second output face.

9. The light guide structure of claim 8, wherein
the first end of the bridge is connected to the first light guide between the first input face and the first output face, and
the second end of the bridge is connected to the second light guide between the second input face and the second output face.

10. The light guide structure of claim 1, wherein
the first light guide, the second light guide, and the bridge are integrally formed of a same material.

11. The light guide structure of claim 10, wherein
the first light guide, the second light guide, and the bridge are integrally formed as an acrylic prism.

12. The light guide structure of claim 1, wherein
the first light guide and the second light guide are coated with a reflective material.

13. An illuminated indicating device, comprising:
a display surface;
a light source; and
a light guide structure disposed between the display surface and the light source, the light guide structure including
a first light guide and a second light guide configured to guide light from the light source to the display surface;
a bridge integrally formed with the first light guide and the second light guide, the bridge including
a first end connected to the first light guide,
a second end connected to the second light guide, and
a light trap section formed between the first end and the second end, wherein
the light trap section includes an inwardly V-shaped wall section and a outwardly V-shaped wall section on opposing sides from each other, the inwardly V-shaped wall section configured with a greater V-angle than the outwardly V-shaped wall section,
wherein
the display surface is a front panel including a plurality of display indicia,
the light source is a circuit substrate including a plurality of light emitting diodes,
the first light guide includes a first input face and a first output face, the first light guide being configured to guide light from the first input face to the first output face,
the second light guide includes a second input face and a second output face, the second light guide being configured to guide light from the second input face to the second output face,
the first input face and the second input face are positioned to face the plurality of light emitting diodes, and
the first output face and the second output face are positioned to face the plurality of display indicia.

14. The illuminated indicating device of claim 13, further comprising:
a support structure disposed between the display surface and the light source, the support structure configured to partially house the light guide structure to position the light guide structure with respect to the display surface and the light source.

15. The illuminated indicating device of claim 13, wherein
the plurality of light emitting diodes are configured to be selectively powered to illuminate the plurality of display indicia.

16. The illuminated indicating device of claim 13, wherein
the display surface is a front panel of a vehicle instrument cluster.

17. A light guide structure, comprising:
a first light guide configured to guide light therein;
a second light guide configured to guide light therein; and
a bridge integrally formed with the first light guide and the second light guide, the bridge including
a first end connected to the first light guide,
a second end connected to the second light guide, and
a light trap section formed between the first end and the second end,
wherein
the light trap section includes an inwardly V-shaped wall section and a outwardly V-shaped wall section on opposing sides from each other, the inwardly V-shaped wall section configured with a greater V-angle than the outwardly V-shaped wall section,
wherein
the first light guide includes a first input face and a first output face, the first light guide being configured to guide light from the first input face to the first output face, and the second light guide includes a second input face and a second output face, the second light guide being configured to guide light from the second input face to the second output face.

* * * * *